US008694485B2

(12) United States Patent  
Pigeon (10) Patent No.: US 8,694,485 B2
(45) Date of Patent: Apr. 8, 2014

(54) INTERACTIVE MEDIA CARD (76) Inventor: Normand Pigeon, Cookshire-Eaton (CA)

(*) Notice: Subject to any disclaimer, the term of this patent is extended or adjusted under 35 U.S.C. 154(b) by 68 days.

(21) Appl. No.: 13/549,010

(22) Filed: Jul. 13, 2012

(65) Prior Publication Data

US 2013/0018908 A1 Jan. 17, 2013

Related U.S. Application Data (60) Provisional application No. 61/507,813, filed on Jul. 14, 2011.

(51) Int. Cl.
*G06F 17/30* (2006.01)

(52) U.S. Cl.
USPC .......... 707/712; 707/705; 707/722; 707/728; 707/770; 707/758; 709/201; 709/203; 709/213; 709/217; 455/414.1; 455/418; 455/456.3

(58) Field of Classification Search
USPC .......... 707/705, 712, 722, 728, 770; 709/201, 709/203, 213, 217; 455/414.4, 418, 456.3
See application file for complete search history.

(56) References Cited

U.S. PATENT DOCUMENTS

| | | | | |
|---|---|---|---|---|
| 6,442,263 | B1* | 8/2002 | Beaton et al. | 379/142.04 |
| 6,993,500 | B2* | 1/2006 | Ishihara | 705/27.1 |
| 7,343,006 | B2* | 3/2008 | Klearman et al. | 379/114.19 |
| 7,596,605 | B2* | 9/2009 | Sung et al. | 709/206 |
| 8,005,904 | B2* | 8/2011 | Yokoyama et al. | 709/206 |
| 8,156,330 | B2* | 4/2012 | Yu et al. | 713/168 |
| 2002/0165794 | A1* | 11/2002 | Ishihara | 705/26 |
| 2003/0019935 | A1* | 1/2003 | Giannulli | 235/462.25 |
| 2003/0043974 | A1* | 3/2003 | Emerson, III | 379/88.13 |
| 2005/0177433 | A1* | 8/2005 | Klearman et al. | 705/16 |
| 2005/0245247 | A1* | 11/2005 | Seo et al. | 455/418 |
| 2006/0075231 | A1* | 4/2006 | Yu et al. | 713/168 |
| 2006/0136251 | A1* | 6/2006 | Sung et al. | 705/1 |
| 2006/0190557 | A1* | 8/2006 | Bhogal et al. | 709/217 |
| 2009/0216839 | A1* | 8/2009 | Yokoyama et al. | 709/206 |
| 2010/0021173 | A1* | 1/2010 | Zhang et al. | 398/98 |
| 2010/0301114 | A1* | 12/2010 | Lo Faro et al. | 235/380 |
| 2011/0124350 | A1* | 5/2011 | Sukovic | 455/456.3 |
| 2011/0173298 | A1* | 7/2011 | Nam | 709/219 |
| 2012/0083253 | A1* | 4/2012 | Van Der Vis-Kruijswijk | 455/414.1 |
| 2012/0233192 | A1* | 9/2012 | Pinault et al. | 707/758 |
| 2012/0311676 | A1* | 12/2012 | Ibasco et al. | 726/4 |

* cited by examiner

*Primary Examiner* — Frantz Coby
(74) *Attorney, Agent, or Firm* — Freedman & Associates (57) ABSTRACT

A method is disclosed wherein a capsule is searchable, the capsule of data having data stored in multiple data stores. In use, a portion of the capsule is displayed and the searched data includes data that is not displayed but is retrievable via the search operation.

30 Claims, 5 Drawing Sheets

INTERACTIVE MEDIA CARD

FIELD OF THE INVENTION

The present invention relates to electronic business cards and the improvement thereof.

BACKGROUND

The business card is commonly used to exchange business contact information between business associates. The present form of the business card is relatively standardized and is used in Rolodexes and in electronic equivalents the world over. Advantageously, a business card includes contact information for people you meet and is easily and conveniently carried and exchanged.

Unfortunately, in today's business world, many introductions and other exchanges happen electronically or by voice communication wherein a business card cannot be readily exchanged. To this end, electronic business cards, or vCards, have been developed. A vCard is an electronic business card comprising contact information for an individual. Though many applications export vCards, they have yet to be standardized such that all electronic contact systems import them. Further, the inclusion of contact information within a vCard has been standardized on the lowest common denominator—the minimum information set for an individual's contact information, instead of benefiting from the wide array of contact mechanisms available to businesses today.

It has now become apparent that a better means of electronically sharing business contact information would be useful.

SUMMARY OF EMBODIMENTS OF THE INVENTION

A method comprising providing a capsule comprising data therein, the data therein one of stored in association with the capsule and indicated by data within the capsule, the capsule and the data therein relating to an entity and associated therewith; displaying a visible portion of the capsule to an end user; searching a predetermined subset of data within the capsule, the predetermined subset of data including data within the capsule not visible to the end user within the visible portion until searched or accessed, the predetermined subset of data relating to at least two different stores of information, the predetermined subset less than the whole and selected by the entity.

A method comprising providing a capsule comprising data therein, the data therein one of stored in association with the capsule and indicated by data within the capsule, the capsule and the data therein relating to an entity and associated therewith; displaying a visible portion of the capsule to an end user; searching a predetermined subset of data within the capsule, the predetermined subset of data including data within the capsule not visible to the end user within the visible portion until searched or accessed, the predetermined subset of data relating to at least two different stores of information both relating to a same entity.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Throughout the detailed description and in the appended claims, the following terms are to be accorded the following definitions:

Entity—is for example a person, an end user, or a company.

Capsule—as used herein is defined as a grouping of data comprising data indicating at least two different data stores wherein further data associated therewith is stored. Capsule data comprises data stored within the capsule and the data in the indicated different data stores.

Media card—as used herein is defined as a visual representation of at least a subset of data within the capsule for use in distribution of data from within the capsule. Typically the user defines the media card to have relatively consistent visual representation of the at least subset of data within the capsule.

End user—is defined as a person viewing and accessing capsule data via a media card.

Figure 1:
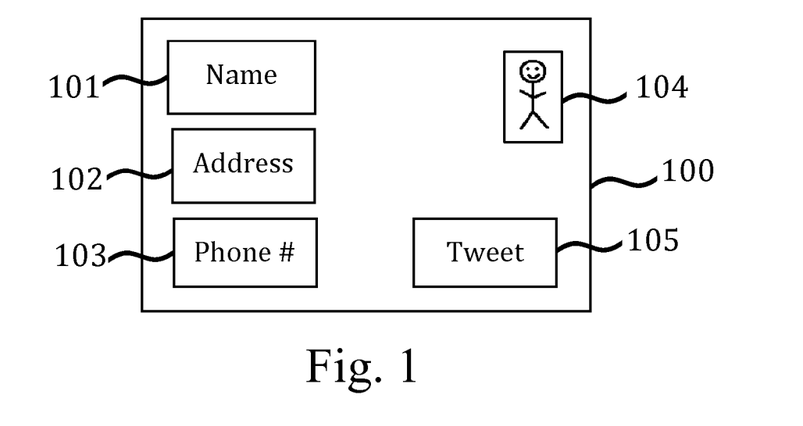
FIG. 1 is an illustration of a media card defined by an entity in the form of a businessman and intended for clients.

According to an embodiment of the invention FIG. 1 illustrates media card 100, defined by an entity in the form of a businessman and intended for clients. Media card 100 comprises the businessman's name 101, address 102, phone number 103, photo 104, and latest Twitter® tweet 105. The businessman sends an email to a client with media card 100 attached. The client's email reader is compatible with media card 100 and the client opens media card 100 by selecting the media card icon embedded within the email. The media card interactive interface is displayed and the client views the information listed above.

Optionally, the businessman utilizes the media card as a marketing tool, wherein the media card interface is uniquely designed for communicating the businessman's corporate image and branding message. For example, the media card interface displays the data shown in FIG. 1 as well as a corporate logo, key marketing messaging, and a list of his services. Occasionally, key market messaging is updated, however the media card's look in general remains consistent. This consistency will help his clients to identify him with the image he wishes to portray via the media card interface. Optionally, the media card can be forwarded in an email. Alternatively the media card is viewed within an email. Alternatively, selecting a media card icon launches a website wherein the media card is displayed.

Alternatively, the media card is embedded in an online document accessible via a web link.

Optionally, the device on which the media card is viewed determines the media card functionality. For example, the media card when viewed on a mobile phone provides the optional functionality of automatically dialing the businessman's phone number when the end user selects the businessman's phone number displayed on the media card interface. Another example, the media card when viewed on a laptop provides the optional functionality of automatically launching a new email addressed to the businessman when the end user selects the businessman's email address displayed on the media card interface.

Figure 2:
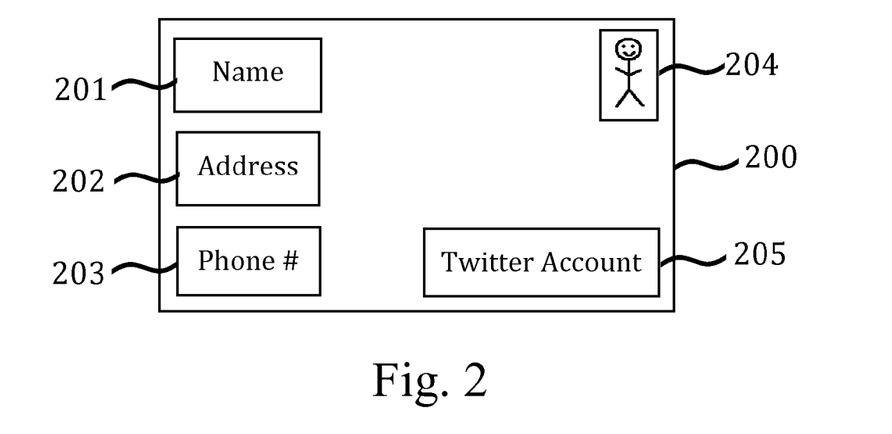
FIG. 2 is an illustration of a capsule defined by a businessman which comprises data relating to the businessman's name, address, phone number, photo, and a link to the businessman's latest Twitter® tweet.

Optionally, the media card display is dependent on the media upon which it is viewed. The data displayed on a first media card interface is the same for a plurality of viewing media, however, the appearance of the first media card interface and media card data on a mobile device, a web browser, as an attachment to an email, tablet, iPhone®, and other viewing media is unique. For example, the appearance of a first media card viewed on a mobile device is different than the appearance of the first media card displayed in a web browser. However, the first media card data displayed on the mobile device and in the web browser is the same FIG. 2 illustrates capsule 200 defined by the businessman which comprises data relating to the businessman's name 201, address 202, phone number 203, photo 204, and a link to the businessman's latest Twitter® tweet 205. The businessman selected all data in capsule 200 to be at least visible on media card 100. Optionally, capsule data indicates data sources, for example social media sites. Further optionally, capsule data indicates the businessman's email. Even further optionally, capsule data comprises URL links to websites, usernames, passwords, and so forth. Alternatively a capsule is created for an entity, for example a corporation.

Figure 3:
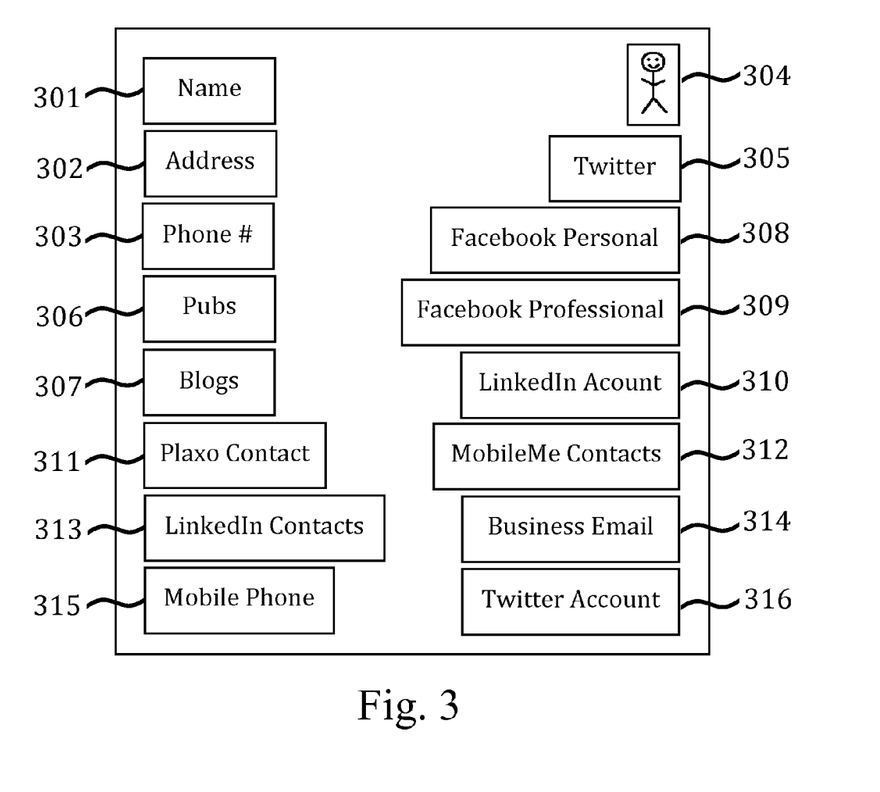
FIG. 3 is an illustration of a businessman's modified capsule to form another capsule wherein he added new personal and professional data.
Figure 4:
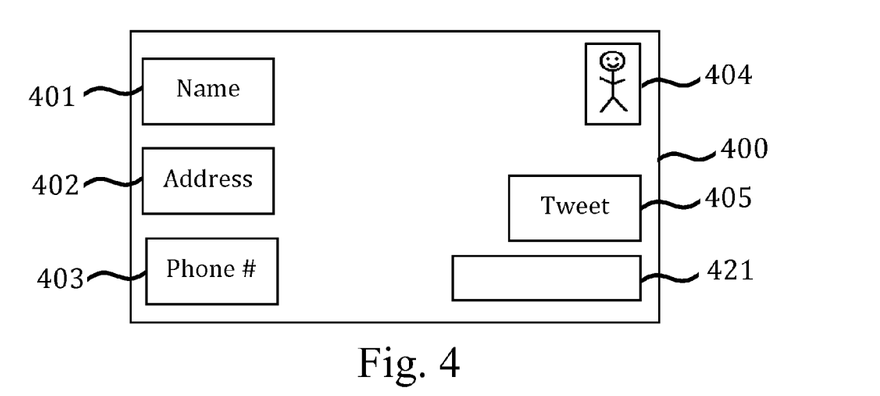
FIG. 4 is an illustration of a modified client media card forming a second media card.

According to an embodiment of the invention a media card comprises a subset of associated capsule data. As shown is FIG. 3, the businessman modified capsule 200 to form capsule 300 wherein he added new personal and professional data relating to publications 306, blogs 307, a link to the businessman's Facebook® personal profile 308, a link to the businessman's Facebook® business profile 309, a link to the businessman's LinkedIn® account 310, Plaxo® contacts 311, MobileMe® contacts 312, business email 314, Twitter® account 316, and Mobile phone number 315. Typically at least some of the external data is included via links or pointers thereto as opposed to being imported. Illustrated in FIG. 4 is modified client media card 100 forming media card 400. The businessman decides that information in publications 306, Facebook® business profile 309 and LinkedIn® profile 310 would be useful to clients, and selects the listed data in capsule 300 and adds it to media card 400. When viewed by the client a first portion of the capsule data is displayed on the media card's interactive interface, comprising the businessman's name 401, address 402, phone number 403, photo 404, latest Twitter® tweet 405, and search box 421. A second portion of the capsule data is accessible to the client via a search box displayed on the interactive interface, comprising publications 306, older Tweets 316, Facebook® business profile 309, and LinkedIn® profile 310. For example, a client wishes to determine if the businessman has received any professional awards, and types keywords "awards achievements" in the search box 421. All data selected for media card 400 is searched for information relating to the keywords, including online Facebook business profile 309 and online LinkedIn® profile 310. Related data is retrieved and is displayed for the client on the media card interface. A third portion of capsule data comprising blogs 307, Facebook® personal profile 308, Plaxo® contacts 311, MobileMe® contacts 312, Linkedin contacts 313, business email 314, and mobile phone number 315 are other than viewable, accessible or searchable by the client as these data sources were other than selected by the businessman for media card 400.

Optionally, a media card is forwardable in an email. Optionally, a media card is viewed on a mobile device; for example, the media card is formatted for viewing on said mobile device. Alternatively the media card is viewed within an email, for example in a signature portion thereof. Further alternatively, selecting a media card icon launches a website wherein the media card is displayed. Alternatively, the media card is embedded in an online document accessible via a web link. Even further alternatively, a keyword is highlighted when the end user's mouse hovers over the keyword and is searched for when the keyword is selected.

Optionally, the media card display is dependent on the media upon which it is viewed. The data displayed on a first media card interface is the same for a plurality of viewing media, however, the appearance of the first media card interface and media card data on a mobile device, a web browser, as an attachment to an email, tablet, iPhone®, and other viewing media is unique. For example, the appearance of a first media card viewed on a mobile device is different than the appearance of the first media card displayed in a web browser. However, the first media card data displayed on the mobile device and in the web browser is the same.

Alternatively, related data resulting from a data search is displayed other than in the media card interface. Further alternatively, related data resulting from a data search is displayed in a new window. For example, a client wishes to determine if the businessman has received any professional awards, and types keywords "awards achievements" in the search box. All data selected for media card 400 is searched for information relating to the keywords, including online Facebook business profile 309, and LinkedIn® profile 313. Related data is retrieved, and a separate window outside the media card interface is launched and is displayed for the client on the media card interface.

Alternatively, keywords are typed into other than the media card interface. For example, keywords are typed into a webpage. For example, a client wishes to determine if the businessman has received any professional awards, and selects a "search" button of the media card interface. A webpage is launched and the client types keywords "awards achievements" in the search box. All data selected for media card 400 is searched for information relating to the keywords, including online Facebook business profile 309 and online LinkedIn® profile 310. Related data is retrieved, and displayed on the webpage.

Optionally, the device on which the media card is viewed determines the media card functionality and/or format. For example, the media card when viewed on a mobile phone provides the optional functionality of automatically dialing the businessman's phone number when the end user selects the businessman's phone number displayed on the media card interface. Another example of the media card when viewed on a laptop comprising an email program provides the functionality of automatically launching a new email addressed to the businessman when the end user selects the businessman's email address displayed on the media card interface.

Optionally, capsule 300 comprises URLs to media that the businessman would like to share with his clients. For example, links to industry educational videos and videos the businessman has created for promotional purposes on you tube. Video links are selected for media card 400 and are accessible and searchable via search box 421. Alternatively, capsule 200 comprises webcast links. Further alternatively capsule 200 comprises audio file links.

Figure 5:
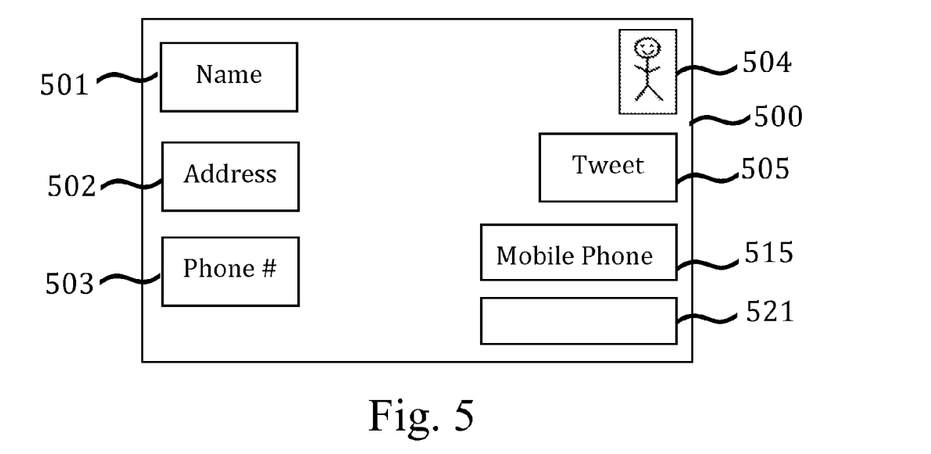
FIG. 5 is an illustration of a second media card defined by a businessman for business colleagues, comprising the same data selected for a first media card as well as new data.

According to the above embodiment, a plurality of media cards is defined for a plurality of end users. For a known end user an entity selects a subset of data from their capsule data to be displayed on the media card and accessible to the end user. Shown in FIG. 5, the businessman defines a second media card 500 for business colleagues, comprising the same data selected for media card 400 as well as new data comprising publications 306, Facebook® business profile 309, LinkedIn® profile 310, Plaxo contacts 311, MobileMe® contacts 312, business email 314, and mobile phone number 303. A business colleague views the second media card on a laptop and sees businessman's name 501, address 502, phone number 503, photo 504, latest Twitter® tweet 505, mobile phone number 515 and search box 521. The client types "contacts" into the search box 521. Data selected for media card 500 is searched for data relating to the keyword "contacts". Data is retrieved from contact management sources LinkedIn®, Plaxo® and MobileMe® and is displayed on the media card interface. Next, the business colleague types, "November tweet" into search box 521. The businessman's twitter account is searched for tweets distributed in November. Relevant tweets are displayed on the media card interface. In this example, business colleagues have access to information that is other than accessible by clients. For example, business colleagues who have the businessman's mobile phone number 515 can search the businessman's emails 514 for emails that comprise information relating to the business colleague. Optionally, data from contact management sources are searched.

Figure 6:
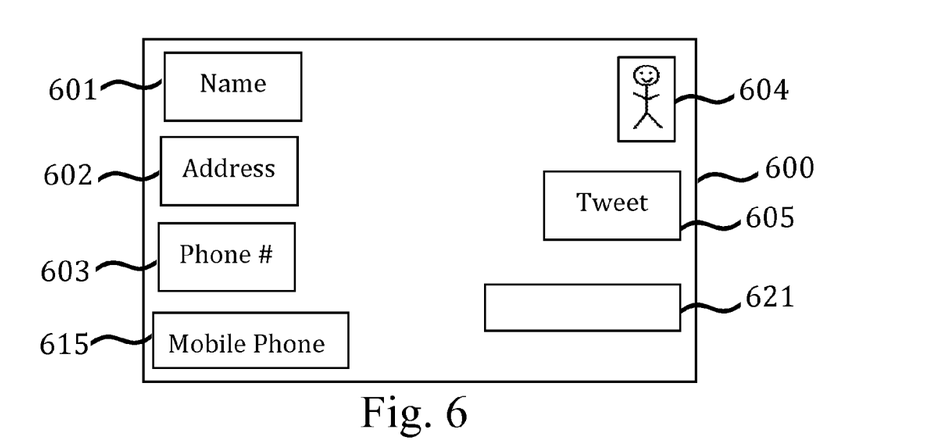
FIG. 6 is an illustration of a businessman's personal media card to share his personal information with friends.

Optionally, a media card is forwarded in an email. Optionally, a media card is viewed on a mobile device; in such an instance, the media card is preferably formatted for the mobile device. Alternatively the media card is viewed within an email. Alternatively, selecting a media card icon launches the media card on a website. Alternatively, the media card is embedded in an online document accessible via a web link. Alternatively, related data resulting from a data search is displayed other than in the media card interface. Further alternatively, related data resulting from a data search is displayed in a new window. Alternatively, keywords are typed into other than the media card interface. Further alternatively, keywords are typed into a webpage. Yet further alternatively, keywords are highlighted when the end user's mouse hovers over a keyword and searched for when the keyword is selected Optionally, the media card display is dependent on the media upon which it is viewed. The data displayed on a first media card interface is the same for a plurality of viewing media, however, the appearance of the first media card interface and media card data on a mobile device, a web browser, as an attachment to an email, tablet, iPhone®, and other viewing media is unique. For example, the appearance of a first media card viewed on a mobile device is different than the appearance of the first media card displayed in a web browser. However, the first media card data displayed on the mobile device and in the web browser is the same The businessman defines a third media card in the form of a personal media card 600 as illustrated in FIG. 6. Wishing to share his personal information with friends he selects from data capsule 300 his name 601, address 602, phone number 603, photo 604, latest Twitter® tweet 605, mobile phone number 615, blogs 307, Facebook personal profile 308 and Twitter® account 316 to be viewed and accessed via media card 600. He thinks his family would be other than interested in the professional data stored in capsule 300, and other than selects publications 306, a link to the businessman's Facebook® business profile 309, a link to the businessman's LinkedIn® account 310, Plaxo® contacts 311, MobileMe® contacts 312, and business email 314. The businessman emails a friend, Bob, and attaches media card 600. Bob receives the email and selects the media card icon embedded in the email and it opens. The media card interface shows his name 601, address 602, phone number 603, photo 604, latest Twitter® tweet 605, mobile phone number 615 and search box 621. Bob wants to read about the businessman's holiday in Paris and types the keyword "Paris" in search box 621. Data selected for media card 600 is searched for data relating to the keyword "Paris." Pictures from Facebook personal profile 308, information for blogs 307, and tweets relating to the keyword Paris is retrieved and displayed. If Bob's company also has an office in Paris, it is possible that information about the Paris office would also be returned given that Bob included his business' public profile in the capsule. The above examples illustrate that one entity's capsule is associated with a plurality of media cards. An entity, for example a user, can consolidate self-related information within one capsule and can distribute portions of this information based on relevance to an end user.

According to an embodiment of the invention a media card is updated when associated capsule data is modified. For example, capsule 200 capsule data Twitter® link 205 was selected for a client's media card 100. The client opens media card 100 and the most recent twitter feed is retrieved from the businessman's Twitter account. The tweet is displayed on the media card interface and reads, "We are pleased to announce the new Manager of R&D, Ms. Jane Smith."

The following day the client re-opens the same instance of media card 100 and again the most recent twitter feed is retrieved from the businessman's Twitter account. The tweet is displayed on the media card interface and reads, "Product introduction countdown—2 days." When a media card is opened the most recent capsule data selected for the media card is retrieved and accessible by the end user and in this example it is displayed. Alternatively, media cards are other than updated automatically. Further alternatively, media cards are updated at the viewer's discretion. Optionally, the media card is updated when the user selects an update feature on the media card interface. As such, Media cards when static act like business cards and maintain a history of data relating to when they were created or first viewed. Alternatively, dynamically updated media cards allow an entity to provide a current and updated media card to an end user that will always be as current and updated when viewed if the entity maintains the data therein.

Figure 7:
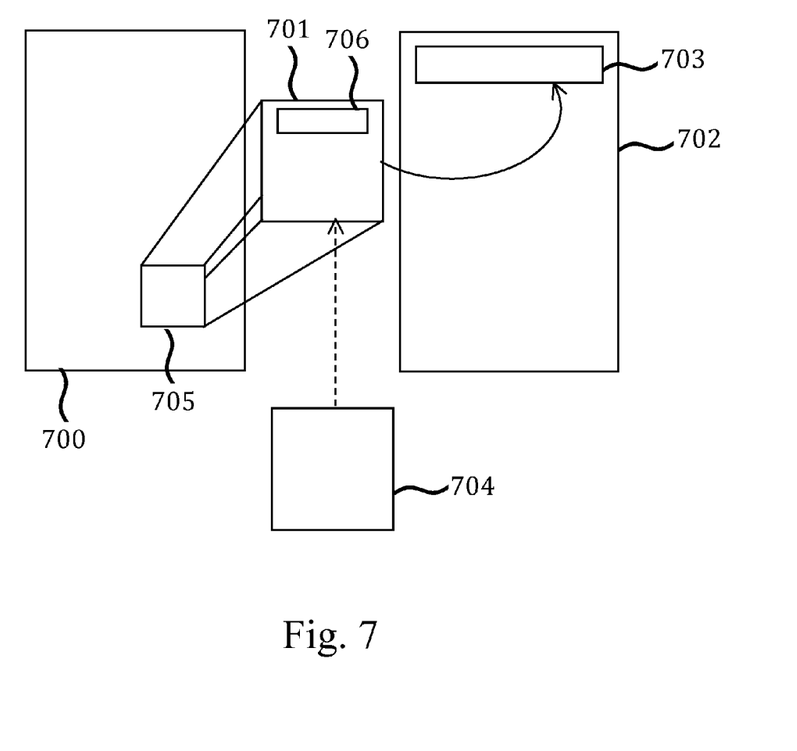
FIG. 7 is an illustration of a contractor's media card attached to an email.

According to an embodiment of the invention, a media card is used as search criteria for a search engine. Shown in FIG. 7 is a media card of a contractor attached to email 700 in the form of a media card 701. Alternatively media card 701 forms part of email 700. The contractor emailed media card 701 to a customer, for example, in an effort to gain new business. The customer opens media card 701 by selecting the media card icon 705 embedded in email 700. The customer types a keyword for example, "customers," into the search box 706 to determine who has used the contractor's services before. When the customer has completed searching within media card 701, he decides to perform a general search for information pertaining to the contractor on the Internet. He opens a web browser and search engine in the form of Google® 702, and instead of typing keywords into Google's® search box 703, he drags media card 701 to the search box 703. Google searches the Internet for data associated with media card 701 and displays search results. For example, the contractor's LinkedIn page 704 contains a list of his contacts, including John Smith. John's name is within or associated with the media card 701 based upon which Google® searches the Internet. Information associated with John and the contractor whose media card 701 was searched found on the Internet is displayed, including a link to a community charity website where both John and the contractor are listed as members. The customer is happy knowing that the contractor is charitable and invests time and energy into helping the community. Next the customer would like to search for information relating to masons with which the contractor is in contact. Adding the word "mason" to Google's search box 703, along with media card 701, the Google® search engine searches for data relating to masons referenced in media card 701 or associated therewith on the Internet. Search results are displayed comprising URLs to masons websites, review blogs of the masons, and so forth wherein the masons are related to media card 701. Alternatively, the masons' relation to media card 701 is determined based on operators provided with the media card, such as Boolean operators. Next the customer would like to search for information relating to plumbers with which the contractor is in contact. However, there is a plumbing company, The Plumbing Co., that the customer has employed before which he does not wish to employ again, even if the contractor has referenced the company in media card 701. Using a Boolean operator to indicate that search results other than include The Plumbing Co., for example adding,—"The Plumbing Co." in Google's® search box 703, along with the word "plumber" to Google's search box 703 and media card 701, and the Google® search engine searches for data relating to plumbers referenced in media card 701, other than The Plumbing Co., on the Internet. Search results are displayed comprise URLs to plumbers' websites, review blogs of the plumbers, and so forth.

Alternatively, a Boolean operator is applied to the media card wherein search results comprise data other than capsule data. Alternatively, the media card's URL is entered into the search engine search box. Further alternatively, the media card icon is dragged and dropped into the search engine search box. Alternatively, the search engine searches data stored within an Intranet. Further alternatively, the search engine searches a single host computer. Even further alternatively, the search engine searches a data store.

Figure 8:
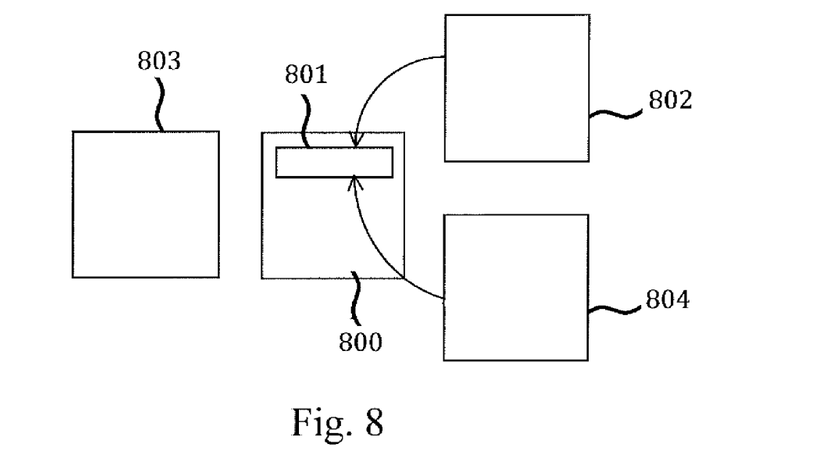
FIG. 8 is an illustration of a capsule and an associated media card in the form of a musician's media card comprising a search box.

Optionally, the media card display is dependent on the media upon which it is viewed. The data displayed on a first media card interface is the same for a plurality of viewing media, however, the appearance of the first media card interface and media card data on a mobile device, a web browser, as an attachment to an email, tablet, iPhone®, and other viewing media is unique. For example, the appearance of a first media card viewed on a mobile device is different than the appearance of the first media card displayed in a web browser. However, the first media card data displayed on the mobile device and in the web browser is the same According to an embodiment of the invention a first media card is used as search criteria for searching capsule data associated with a second media card. Referring to FIG. 8 shown is capsule 803 and associated second media card in the form of a musician's media card 800 comprising search box 801. The musician is in the process of selecting band members for his new band and has received from a drummer a first media card in the form of media card 802. The musician prefers to hire like-minded people and would like to determine any commonality between the drummer and himself. He selects and drags media card 802 into search box 801. Capsule 803 data is searched for data associated with media card 802. The search results are displayed and comprise venues that both the musician and drummer have played, contacts that they have in common, music they both like, email lists they both subscribe to, and so forth. Alternatively, the first media card's URL is entered into the second media card's search box. Further alternatively, the first media card is dragged and dropped into the into the second media card's search box.

Figure 9:
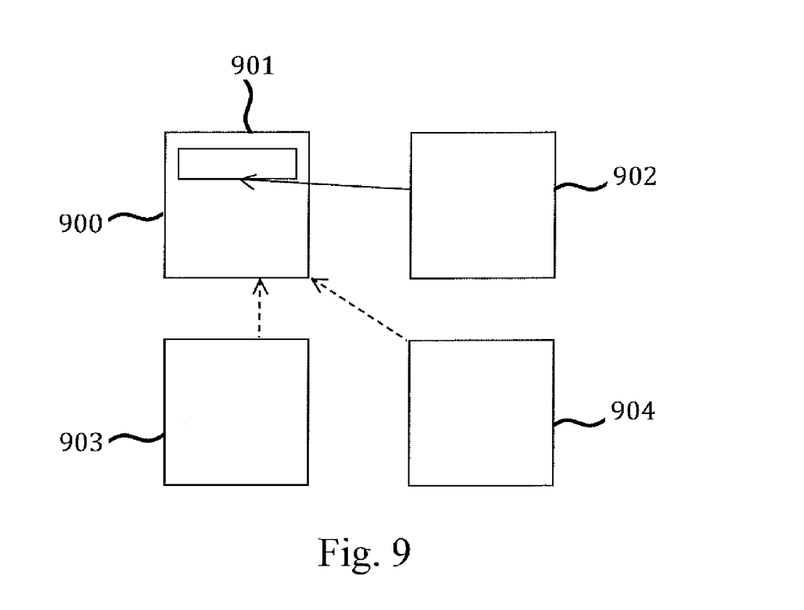
FIG. 9 is an illustration of an executive's media card, comprising a search box and the executive's capsule data associated with the executive's media card.

According to another embodiment of the invention a first media card is used as search criteria for searching capsule data associated with a second media card and within a user specified data store. Referring to FIG. 9 shown is a second media card in the form of an executive's media card 900, comprising search box 901 and the executive's capsule 903 data associated with media card 900. The executive is in the process of hiring a new salesman and has received a first media card in the form of media card 902 from a potential candidate. The executive has previously worked with many people, companies and distributors in industry, and he is interested to know if his path has crossed with that of the candidate before. He selects and drags media card 902 into search box 901. Media card 900 provides a menu for selecting data stores to be searched, within which he selects his email mailbox 904, that is other than associated with capsule 903, to be searched. The search results are displayed and comprise media card 902 data that is associated with capsule 903 data and media card 902 data that is associated with email mailbox 904. For example the results comprise people that are listed as contacts in both capsule 903 and media card 900. The executive takes note of the contacts that he wishes to contact to learn more about the candidate. Also listed in the results are emails that the executive had received from the candidate that the executive forgot about. This jogs his memory and the executive realizes that he in fact had met the candidate when the candidate was a sales representative for another company. Of course, when the executive's staff's emails are within a scope of the executive's data, the results may highlight interactions with the company that the executive was not privy to, which may affect any decision to be made.

Alternatively, the first media card's URL is entered into the second media card's search box. Further alternatively, the first media card icon is dragged and dropped into the second media card's search box. Optionally, the data store is available via an Intranet. Further alternatively the data store is a computer. Even further alternatively, the data is accessible via in the Internet. Alternatively, a media card is launched within the media card, for example on a website. Alternatively, the media card is embedded in an online document accessible via a web link. Alternatively, related data resulting from a data search is displayed other than in the media card interface. Further alternatively, related data resulting from a data search is displayed in a new window. Alternatively, keywords are typed into other than the media card interface. Further alternatively, keywords are typed into a webpage.

Optionally, the media card display is dependent on the media upon which it is viewed. The data displayed on a first media card interface is the same for a plurality of viewing media, however, the appearance of the first media card interface and media card data on a mobile device, a web browser, as an attachment to an email, tablet, iPhone®, and other viewing media is unique. For example, the appearance of a first media card viewed on a mobile device is different than the appearance of the first media card displayed in a web browser. However, the first media card data displayed on the mobile device and in the web browser is the same According to an embodiment of the invention a Boolean operator applied to a third media card is used as search criteria for searching capsule data associated with a second media card. Referring to FIG. 8 shown is a third media card in the form of a Music Instruments' media card 804. The musician described above is in the process of purchasing new instruments and wishes to make a purchase. Unfortunately, in the past, a specific part of his instrument has been inadequate. He knows the manufacture is Music Instruments who is known for manufacturing said part for many years. In order to find distributors of instruments not having those parts, the musician opens Music Instruments' media card 804. He adds the Boolean operator "not" to the search box 801. Next he selects and drags media card 804 into search box 801 and adds the keyword "instruments". Alternatively, he opens a search interface and adds the media card and the operator thereto. The search space is searched for data associated with instruments not having parts from Music Instruments. The search results are displayed and comprise emails and brochures that meet the search criteria. Optionally, the search space is within the musician's capsule. For example, the third media card's URL is entered into the second media card's search box. Alternatively, the third media card icon is dragged and dropped into the into the second media card's search box. Alternatively, a media card is launched within the media card, for example on a website. Alternatively, the media card is embedded in an online document accessible via a web link. Alternatively, related data resulting from a data search is displayed other than in the media card interface. Further alternatively, related data resulting from a data search is displayed in a new window. Alternatively, keywords are typed into other than the media card interface. Further alternatively, keywords are typed into a webpage.

Numerous other embodiments may be envisaged with out departing from the spirit of the invention.

What is claimed is:

1. A method comprising:
providing a capsule comprising data therein to a first system, the data therein one of stored in association with the capsule and indicated by data within the capsule, the capsule and the data therein relating to an entity and associated therewith, the capsule provided from a second other system via a communication network;
displaying a visible portion of the capsule to an end user using an electronic display of the first system;
searching a predetermined subset of data within the capsule, the predetermined subset of data including data within the capsule not visible to the end user within the visible portion until searched or accessed, the predetermined subset of data relating to at least two different stores of information, the predetermined subset less than the whole and selected by the entity; and
displaying search results of searching to the end user using the electronic display of the first system.

2. A method according to claim 1 wherein each of the two different stores is independent one of the other, coupled to the communication network, and comprises data originating from the entity.

3. A method according to claim 2 comprising:
searching a predetermined second subset of data within the capsule, the predetermined second subset of data including data within the capsule not visible to the end user within the visible portion until searched or accessed and different from the predetermined subset of data, the predetermined second subset less than the whole and selected by the entity.

4. A method according to claim 3 wherein the predetermined second subset of data relating to at least two different stores of information independent one of the other and each coupled to the communication network.

5. A method according to claim 1 wherein displaying search results comprises displaying search results relating to a search criteria and a media card from each of a plurality of different data stores coupled via the communication network, the search results displayed in a common interface.

6. A method according to claim 1 wherein displaying search results comprises displaying search results relating to a search criteria and a media card from each of a plurality of different data stores coupled via the communication network, the search results displayed within a media card.

7. A method according to claim 1 wherein displaying a visible portion of the capsule to an end user comprises displaying a graphic representation of data within the capsule, the graphic representation forming a customized view of some of the predetermined subset of data.

8. A method according to claim 7 wherein the graphic representation comprises a static image linked to at least one of a dynamic media card element for supporting interactivity and an interactive graphic representation for supporting interactivity.

9. A method according to claim 7 wherein the graphic representation comprises at least one of an attachment and data forming a link to external content.

10. A method of according to claim 1 wherein displaying a visible portion of the capsule comprises:
retrieving a media card via the communication network with updated data; and
displaying a media card instance and wherein updated data is displayed each time the same media card instance is viewed.

11. A method according to claim 10 wherein displaying a visible portion of the capsule comprises retrieving data from an online database, the data stored in relation to a specific user, the specific user being the entity, the capsule including data relating to the online database and to the entity's account thereon, the data retrieved therefrom for access thereto within the capsule.

12. A method according to claim 11 wherein the online database comprises at least one of LinkedIn, FaceBook®, Plaxo®, Hotmail®, Gmail®, Twitter®, and MobileMe®.

13. A method according to claim 12 wherein displaying a visible portion of the capsule comprises retrieving data from within the capsule, the data comprising personal contact data stored within the capsule.

14. A method of according to claim 1 wherein displaying a visible portion of the capsule comprises displaying a media card instance and wherein locally stored data is displayed each time the same media card instance is viewed and comprising; at intervals selectably updating the media card via the communication network with updated data.

15. A method according to claim 1 wherein displaying a visible portion of the capsule comprises retrieving data from an enterprise storage location, the data retrieved therefrom for access thereto within the capsule.

16. A method comprising:
providing a capsule comprising data therein, the data therein one of stored in association with the capsule and indicated by data within the capsule, the capsule and the data therein relating to an entity and associated therewith;

displaying a visible portion of the capsule to an end user;

searching a predetermined subset of data within the capsule, the predetermined subset of data including data within the capsule not visible to the end user within the visible portion until searched or accessed, the predetermined subset of data relating to at least two different stores of information both relating to a same entity; and displaying search results of searching to the end user using the electronic display of the first system.

17. A method according to claim 16 wherein the predetermined subset of data relating to at least two different stores of information, the predetermined subset less than the whole and selected by the entity.

18. A method according to claim 16 wherein each of the two different stores comprises data originating from the entity.

19. A method according to claim 16 comprising:

searching a predetermined second subset of data within the capsule, the predetermined second subset of data relating to at least two different stores of information and including data within the capsule not visible to the end user within the visible portion until searched or accessed and different from the predetermined subset of data, the predetermined second subset less than the whole and selected by the entity.

20. A method according to claim 16 wherein displaying search results comprises displaying search results relating to a search criteria and a media card from each of a plurality of different data stores coupled via the communication network, the search results displayed in a common interface.

21. A method according to claim 16 wherein displaying search results comprises displaying search results relating to a search criteria and a media card from each of a plurality of different data stores coupled via the communication network, the search results displayed within a media card.

22. A method according to claim 16 wherein displaying a visible portion of the capsule to an end user comprises displaying graphic representation of data within the capsule, the graphic representation forming a customized view of some of the predetermined subset of data.

23. A method according to claim 22 wherein the graphic representation comprises a static image linked to at least one of a dynamic media card element for supporting interactivity and an interactive graphic representation for supporting interactivity.

24. A method according to claim 22 wherein the graphic representation comprises at least one of an attachment and data forming a link to external content.

25. A method of according to claim 16 wherein displaying a visible portion of the capsule comprises:

retrieving a media card via the communication network with updated data; and displaying a media card instance and wherein updated data is displayed each time the same media card instance is viewed.

26. A method according to claim 25 wherein displaying comprises retrieving data from an online database, the data stored in relation to a specific user, the specific user being the entity, the capsule including data relating to the online database and to the entity's account thereon, the data retrieved therefrom for access thereto within the capsule.

27. A method according to claim 26 wherein the online database comprises at least one of LinkedIn, FaceBook®, Plaxo®, Hotmail®, Gmail®, Twitter®, and MobileMe®.

28. A method of according to claim 16 wherein displaying a visible portion of the capsule comprises displaying a media card instance and wherein locally stored data is displayed each time the same media card instance is viewed and comprising: at intervals selectably updating the media card via the communication network with updated data.

29. A method according to claim 16 wherein displaying a visible portion of the capsule comprises retrieving data from within the capsule, the data comprising personal contact data stored within the capsule.

30. A method according to claim 29 wherein displaying a visible portion of the capsule comprises retrieving data from an enterprise storage location, the data retrieved therefrom for access thereto within the capsule.

* * * * *